US010663086B2

(12) United States Patent
Smith

(10) Patent No.: US 10,663,086 B2
(45) Date of Patent: May 26, 2020

(54) SYSTEM AND METHOD FOR MOVING AN ELONGATE ELEMENT

(71) Applicant: Royal IHC Limited, Stocksfield, Northumberland (GB)

(72) Inventor: Michael James Smith, Stocksfield (GB)

(73) Assignee: Royal IHC Limited, Stocksfield Northumberland (GB)

( * ) Notice: Subject to any disclaimer, the term of this patent is extended or adjusted under 35 U.S.C. 154(b) by 0 days.

(21) Appl. No.: 16/310,911

(22) PCT Filed: Jun. 29, 2017

(86) PCT No.: PCT/EP2017/066100
§ 371 (c)(1),
(2) Date: Dec. 18, 2018

(87) PCT Pub. No.: WO2018/002204
PCT Pub. Date: Jan. 4, 2018

(65) Prior Publication Data
US 2019/0195392 A1   Jun. 27, 2019

(30) Foreign Application Priority Data

Jun. 29, 2016   (NL) ..................... 2017072

(51) Int. Cl.
*F16L 1/20*      (2006.01)
*B63B 35/03*     (2006.01)
*F16L 1/19*      (2006.01)

(52) U.S. Cl.
CPC .............. *F16L 1/207* (2013.01); *B63B 35/03* (2013.01); *F16L 1/19* (2013.01); *F16L 1/205* (2013.01)

(58) Field of Classification Search
CPC ... F16L 1/19; F16L 1/205; F16L 1/207; B63B 35/03
See application file for complete search history.

(56) References Cited

U.S. PATENT DOCUMENTS 6,361,250 B1 *   3/2002   de Varax .................. F16L 1/19
                                                      405/158
6,796,742 B1 *   9/2004   Roger et al. ......... B23K 9/0286
                                                      405/166
(Continued)

FOREIGN PATENT DOCUMENTS

FR   2773603 A1   7/1999
GB   2336191 A    10/1999
(Continued)

*Primary Examiner* — Tara Mayo-Pinnock
(74) *Attorney, Agent, or Firm* — E. Eric Mills; Nexsen Pruet, LLC

(57) ABSTRACT

A system and method for moving an elongate element from a first position towards a second position against an upright structure on a vessel are disclosed. The system includes a holding element for holding the elongate element in the first position; a first sliding member pivotally connected to an end region of the holding element, and moveable along a base, ground or deck surface; a further sliding member pivotally connected to a further end region of the holding element, and moveable along the upright structure; and a hoist system operably engaged with the upright structure, the end region of the holding element and the further end region of the holding element, for drawing the holding element towards the upright structure such that the elongate element is moved towards the second position, wherein the hoist system comprises a first portion and a further portion, the first portion arranged to exert a force in a first direction and the further portion arranged to exert a force in a further direction.

11 Claims, 11 Drawing Sheets

(56) References Cited

U.S. PATENT DOCUMENTS

| | | | | |
|---|---|---|---|---|
| 2009/0220306 | A1* | 9/2009 | Roodenburg et al. | F16L 1/19 |
| | | | | 405/195.1 |
| 2015/0316174 | A1* | 11/2015 | Inbona | B63B 35/03 |
| | | | | 405/167 |

FOREIGN PATENT DOCUMENTS

| | | | |
|---|---|---|---|
| GB | 2508867 | A | 6/2014 |
| WO | 2012101233 | A2 | 8/2012 |

\* cited by examiner

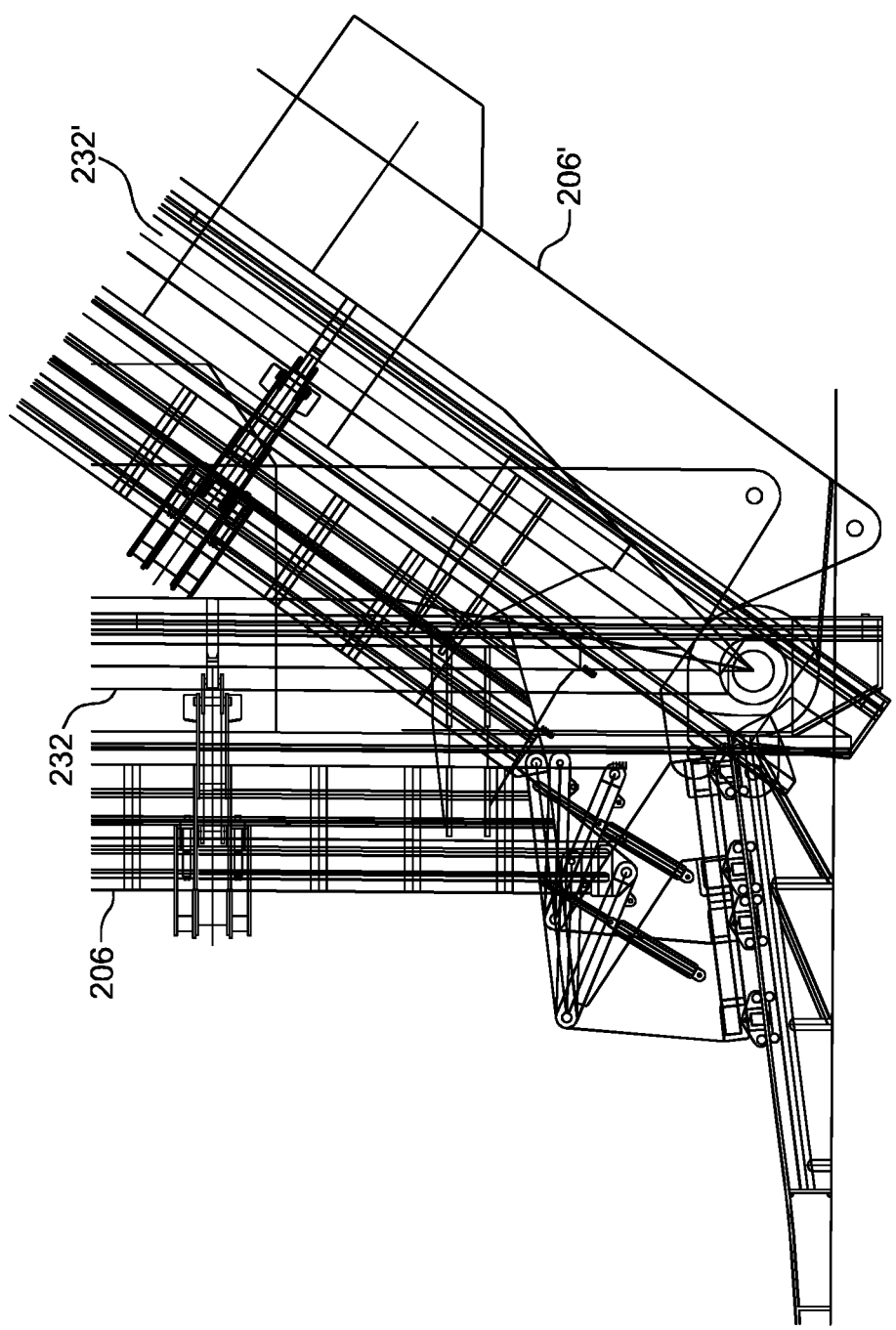

SYSTEM AND METHOD FOR MOVING AN ELONGATE ELEMENT

CROSS REFERENCE TO RELATED APPLICATIONS

This application is a 35 U.S.C. § 371 U.S. national phase entry of International Application No. PCT/EP2017/066100 having an international filing date of Jun. 29, 2017; which claims the benefit of The Netherlands Application No. 2017072 filed Jun. 29, 2016; each of which is incorporated herein by reference in its entirety.

The present invention relates to a system and method. In particular, but not exclusively, the present invention relates to a system and method for laying pipelines from a marine vessel to a subsea location.

Traditionally, pipelines may be deployed from a vessel and onto the sea bed as a continuous pipe length using various techniques. In "J-lay" systems, pipe sections are sequentially added and secured to the pipeline being deployed in an assembly-line type of method.

On a marine vessel, a pipe section is raised from a horizontal position on the deck, to a more vertical position, to be held by a tower. The pipe section is then lowered down the tower until the lower end of the pipe section is in close proximity to an upper end of a previously deployed pipe section (field joint). The lower end of the pipe section is then coupled to the upper end of the previously deployed pipe section by a suitable method of attachment, for example by welding. For effective coupling, both sections are typically held or clamped into position during attachment. Following attachment, the pipe section is lowered from the marine vessel, e.g. via a moon pool or edge of vessel, and the process is repeated. As the pipeline is built up, it is lowered along the "lay-line", i.e. the position the pipeline follows as it is lowered from the tower to the subsea position. As shown in FIG. 1, the lay-line follows the shape of a letter "J" 100.

The welded pipe is thus gradually built, and lowered into the sea water, and will lay on the seabed or in a trench in a predetermined location. The pipe may be used for transporting production fluids such as oil, gas and water along the seabed, for example from a production platform to an on-shore location.

The J-lay technique can be used to lay pipeline at shallow or deep water depths, of typically around 750 m to 1000 m. Typically the pipe diameter may range from 5 to 36 inch (12.7 to 91.44 cm). The pipe section typically may be 12 m in length, though the pipe sections may be pre-welded in sets of 2×12 m lengths (so called double pipe joints, of 24 m) or 4×12 m lengths (so called quad pipe joints, of 48 m).

To accommodate changes in water depth, the tower may be pivotable to different angles, from around 90 degrees (vertical to the deck) for deeper water to around 45 degrees for shallower water.

GB2336191B discloses a marine pipelay system of the "J-lay" type. The system includes: a first trolley for moving a horizontal pipe section along the deck towards a tower; V-section support rollers for raising up a forward portion of the pipe section; a tailcap for supporting the trailing end of the pipe section; a second (mast) trolley provided on the tower for receiving the pipe section from the first trolley via a headclamp and raising the pipe section up the tower using a winch; a pipe handling frame on the tower to hold the pipe section in a standby position, and then to a position aligned with the lay-line; a mid-mast clamp to secure the pipe section in position; an Internal Line-Up Clamp (ILUC) for maintaining alignment of the ends of two pipe sections during welding; and pipe launching apparatus including a static clamp and mobile clamp for lowering the pipe section downwards along the lay-line until the upper end of the pipe section is close to the weld deck ready for a next pipe section to be connected thereto.

WO 2008/120977 discloses a pipeline laying vessel. A pipe section is loaded into a loading arm. An upender is used to raise the pipe section to the tower angle by rotating (pivoting) the pipe section.

Some J-lay systems, such as that described in WO2008/120977, employ a loading arm to hold a pipe section in a position on deck, and move the pipe section to a more vertical position to be presented to the tower.

As shown in FIG. 2, the loading arm typically includes a steel body 102 that forms a container for holding a pipe section, and a series of clamps $104_{1-4}$, which hold the pipe section in place within the loading arm. A first clamp, situated at an end of the loading arm may support radial and axial loads. The remaining three clamps support radial loads only. The clamps actuate to collect and secure the pipe. A main pivot 106 acts as a pivot point for the loading arm to move upwards towards a J-lay tower. A safety shoe 108 may be used as a backstop pipe holder in case the pipe section were to fall from the loading arm when in an upright position.

A problem with some known pipe laying systems is that, because of the changing angle of the tower, when a loading arm and/or pipe section is pivoted towards the tower, the pipe section can arrive at different heights above the field joint (due to the two different arcs of motion). This can be problematic because the time taken to adjust the pipe section to the appropriate position can vary. To ensure a suitable clearance, one option is to always fix the position of the pipe section independent of the tower. But, when the tower is at 90 degrees, the distance above the field joint is relatively large, which then takes a lot of time to lower to the field joint.

With some known systems in which a loading arm moves both pivotally and laterally along a deck towards a tower, a small displacement at the top of the loading arm creates a relatively large displacement at the bottom end, when near the final raised position. Then, the pipe section will be misaligned from the field joint to which it must be welded.

With some known systems in which a pipe section is moved from a generally horizontal position to a generally vertical position, as the pipe section nears the vertical position, the load experienced at the top of the pipe section is very high.

According to a first aspect of the present invention there is provided a system for moving an elongate element from a first position towards a second position adjacent an upright structure on a vessel, comprising:

a holding element for holding the elongate element in the first position;

a first sliding member pivotally connected to an end region of the holding element, and moveable along a base, ground or deck surface;

a further sliding member pivotally connected to a further end region of the holding element, and moveable along the upright structure; and a hoist system operably engaged with the upright structure, the end region of the holding element and the further end region of the holding element, for drawing the holding element towards the upright structure such that the elongate element is moved towards the second position, wherein the hoist system comprises a first portion and a further portion, the first portion arranged to exert a force in a first direction and the further portion arranged to exert a force in a further direction.

According to a second aspect of the present invention there is provided a method of moving an elongate element from a first position towards a second position adjacent an upright structure on a vessel, the method comprising:
holding the elongate element in a first position;
sliding an end region of the elongate element along a base, ground or deck surface;
sliding a further end region of the elongate element along the upright structure; and
drawing the elongate element towards the upright structure such that the elongate element is moved towards the second position, using a hoist system operably engaged with the upright structure, the end region of the holding element and the further end region of the holding element,
wherein the hoist system comprises a first portion and a further portion, the further portion arranged to exert a force in first direction and the further portion arranged to exert a force in a further direction.

Certain embodiments of the invention provide the advantage that an elongate element (e.g. a pipe section) can be moved from a first position (e.g. a generally horizontal position) to a second position (e.g. a more vertical position) in a relatively simple and cost effective manner compared to known systems.

Certain embodiments of the invention provide the advantage that the accuracy of the position at which an elongate member (e.g. a pipe section) is presented above a set point (e.g. a field joint) is improved compared to known systems. This may be the case even when the angle of the tower changes compared to previous lifts.

Certain embodiments provide the advantage that the load experienced by a holding element (loading arm) as it is raised towards a tower is maintained at a lower level compared to known systems. In certain embodiments the load experienced is maintained at the low level throughout the raising motion, giving a smooth transition from a first position (substantially horizontal) to a further, more vertical position.

Certain embodiments provide the advantage that a single, all-in-one system is used to raise a pipe section to a more vertical position, parallel to an upright structure (e.g. a J-lay tower). Some prior art systems require multiple stages and pieces of equipment to attempt this.

Advantageously, this system might provide a reduction in height and mass of the tower, which can become of a high importance when using such a system in a vessel.

Embodiments of the invention are further described hereinafter with reference to the accompanying drawings, in which.

Figure 3A:
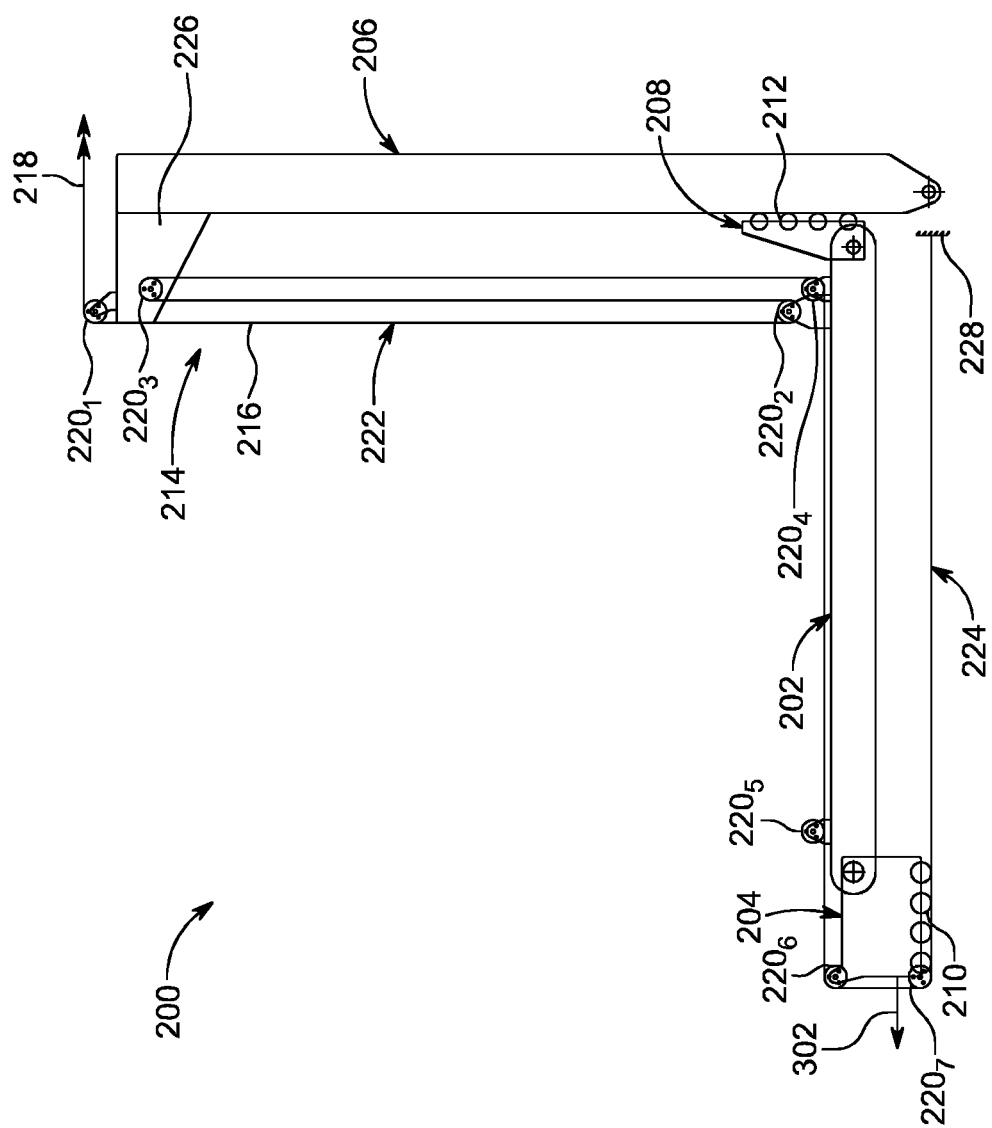
Figure 4:
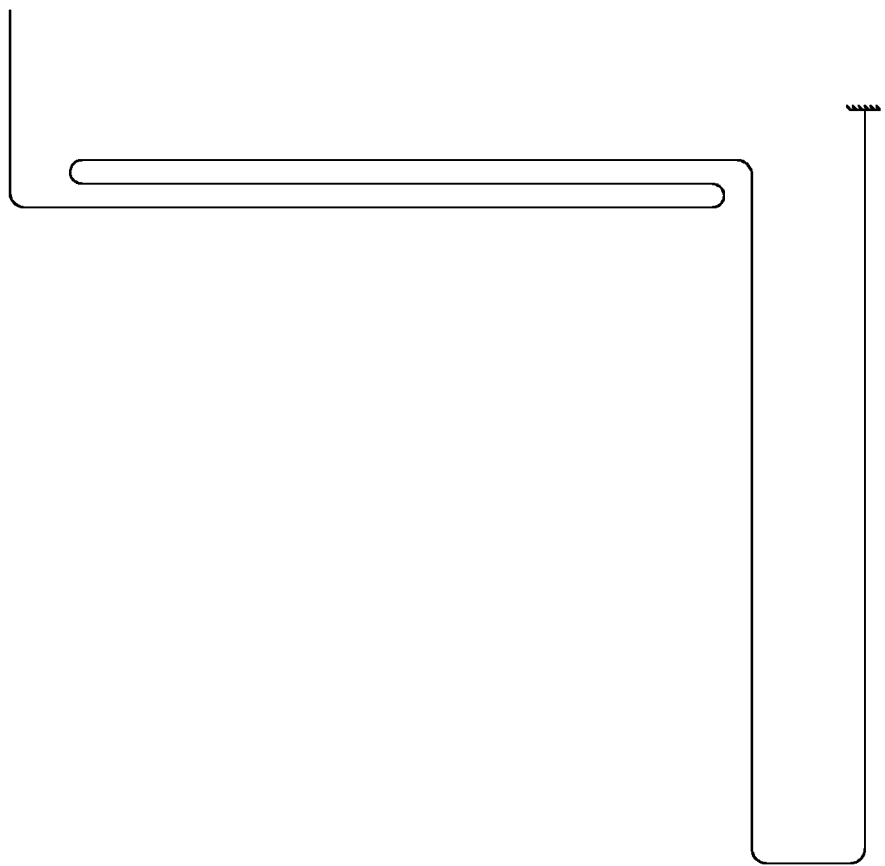
Figure 5:
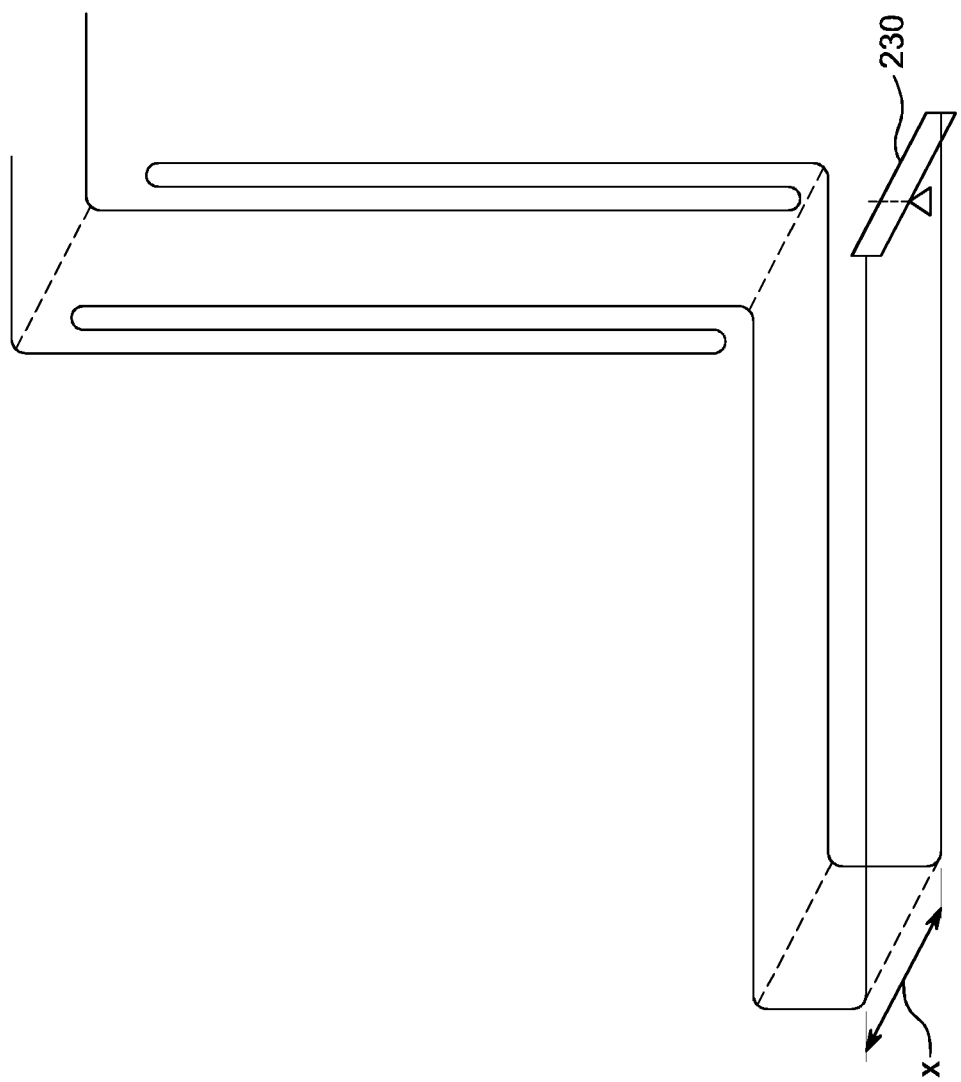
Figure 6:
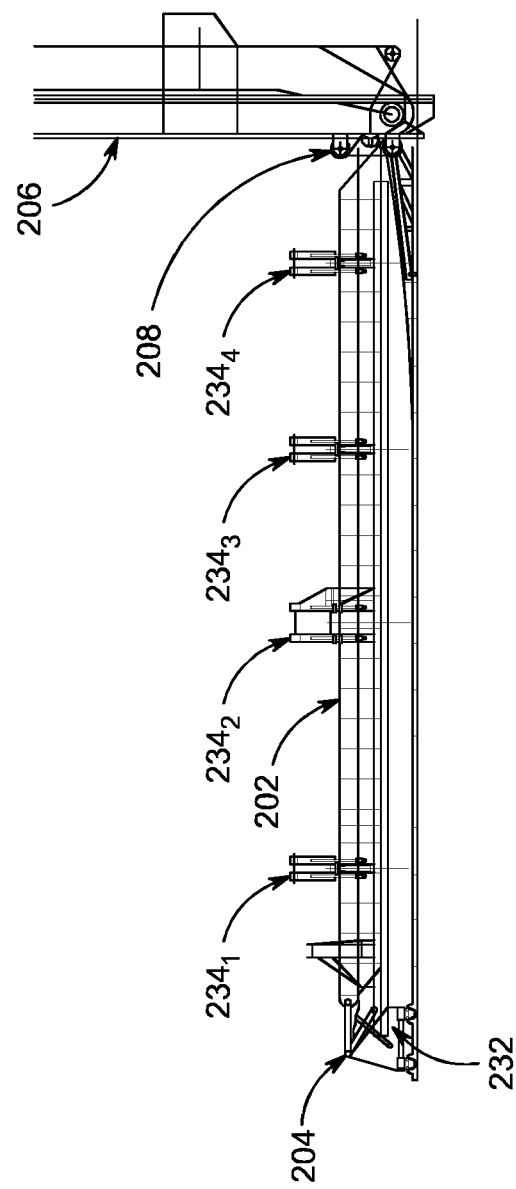
Figure 7:
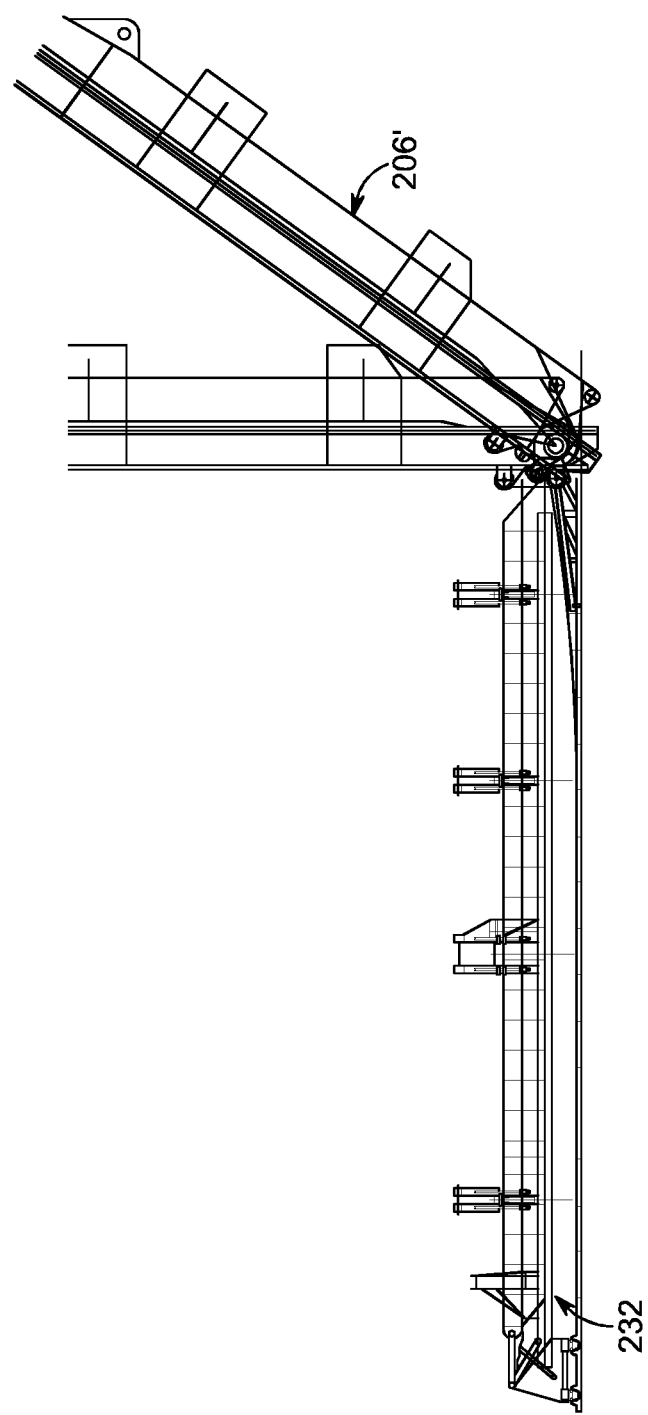

FIGS. 3a-d illustrates a system for moving an elongate element, in a step by step procedure;

FIG. 4 illustrates the route of the hoist rope illustrated in FIG. 3a, without the other features of the system;

FIG. 5 illustrates the route of two parallel running hoist ropes;

FIG. 6 illustrates another view of a loading arm;

FIG. 7 illustrates the arrangement of FIG. 6 with the J-lay tower in two positions;

FIG. 8 illustrates a zoomed in view of the lower end of a J-lay tower.

In the drawings like reference numerals refer to like parts.

Figure 3B:
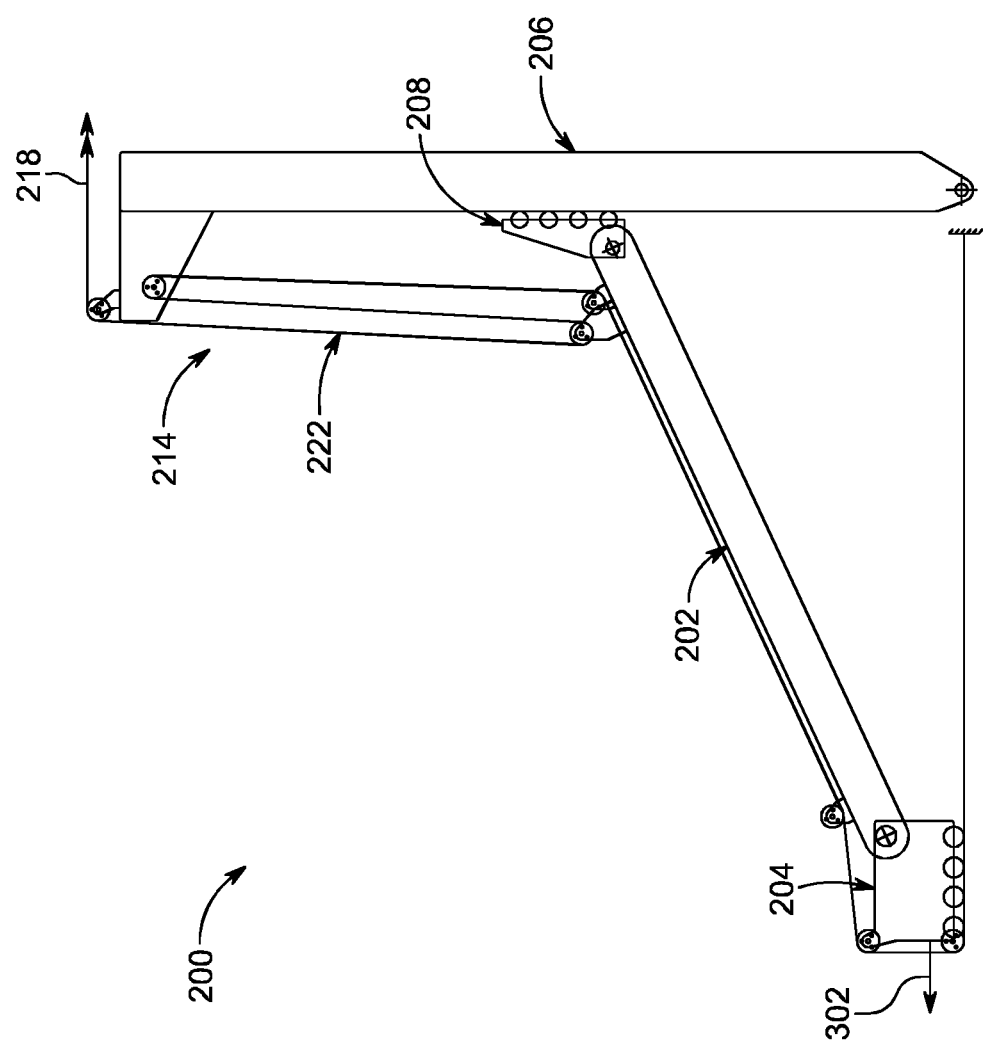
Figure 3C:
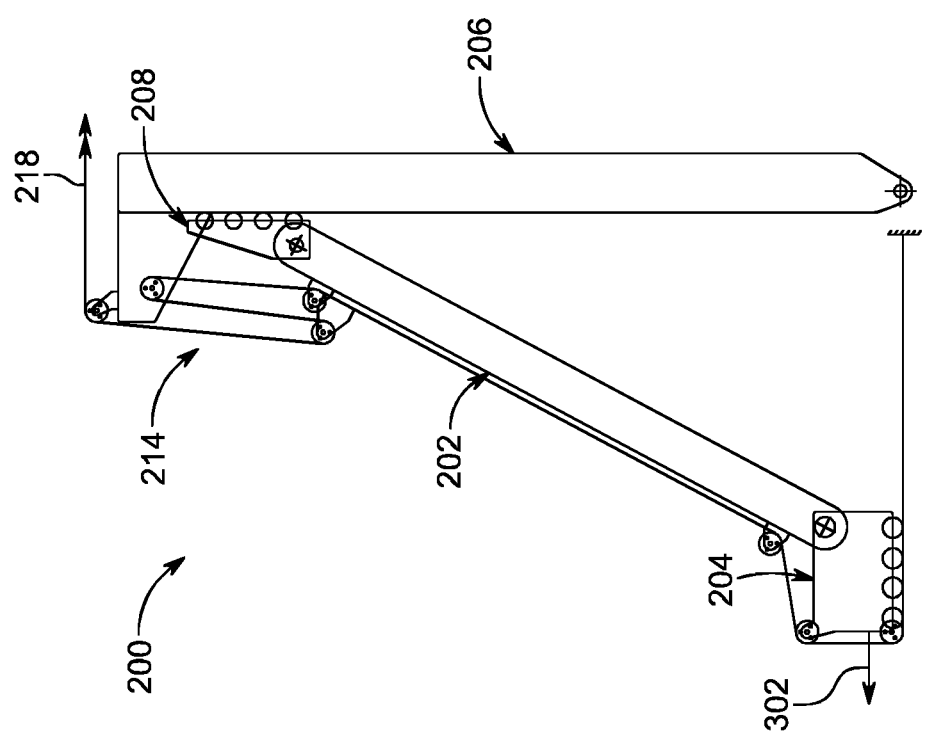
Figure 3D:
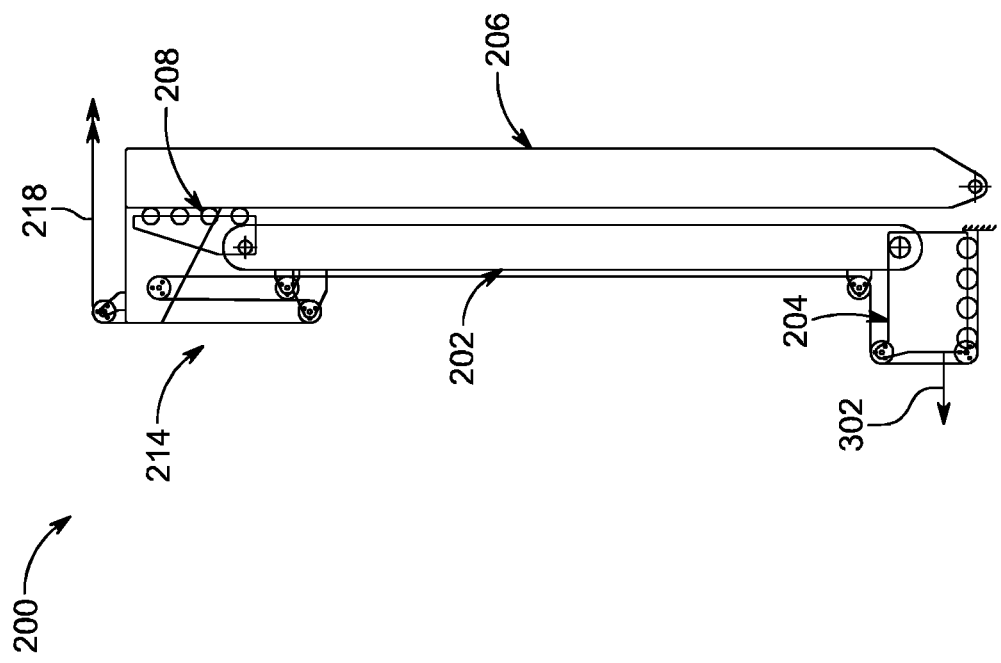

FIGS. 3a to 3d illustrate schematically an embodiment of a system 200 for moving an elongate element (e.g. a pipe section for use in a J-lay operation) from a first position (FIG. 3a) towards a second position adjacent an upright structure (e.g. a J-lay tower) (FIG. 3d). The system may be used, for example, during a J-lay procedure, in raising a pipe section from a generally horizontal position on the deck of a vessel to a more vertical position, against a J-lay tower. From there, the pipe section may go on to the stages of welding/attaching to a further, previously deployed, pipe section and then deployment into the sea, as is known in the art.

As used herein, the terms "generally horizontal position", "substantially horizontal", and the like, are used broadly to cover a position that may be parallel to the ground or to the deck of a vessel (which may itself frequently move from absolute horizontal), or offset somewhat from that horizontal. I.e., more horizontal than vertical to the underlying floor.

As used herein, the terms "generally vertical position", "substantially vertical", and the like, are used broadly to cover a position that may be perpendicular to the ground or to the deck of a vessel (which may itself frequently move from absolute horizontal), or offset somewhat from that vertical. I.e., more vertical than horizontal to the underlying floor.

As used herein, the term "upright structure" is used to cover any erection or assembly that extends from a ground, floor or deck and may extend at any angle, and may change angle. For example, a J-lay tower extends upwards typically between 45 degrees and 90 degrees from a deck of a vessel. However, the structure may be approximately upright or extending outwards/upwards any amount or angle from a base, ground or deck.

As used herein, the term "end region" is used to cover any point or region of a structure that is not a central point. For example, if the structure is an elongate element, the end region may be a point or region at an end, near an end, or not central to the elongate element.

Thus, the first position may be a generally horizontal position, for example prior to deployment when a pipe section is laying on the deck or a platform, and the second position may be more vertical than the first position, for example when being moved towards a J-lay tower for subsequent attachment to further pipeline and deployment into the sea.

Figure 1:
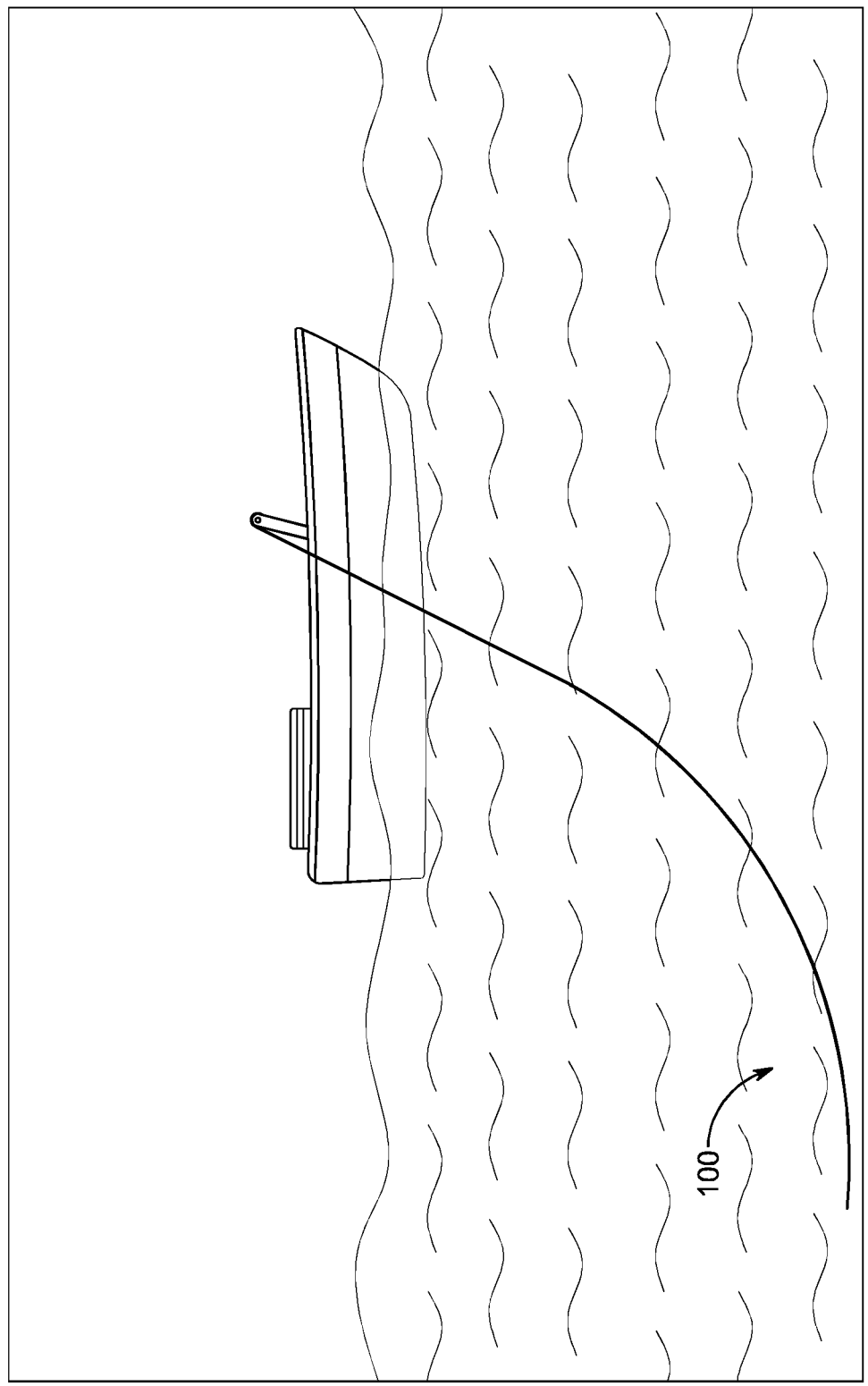
FIG. 1 illustrates a vessel with a "J-lay" assembly.
Figure 2:
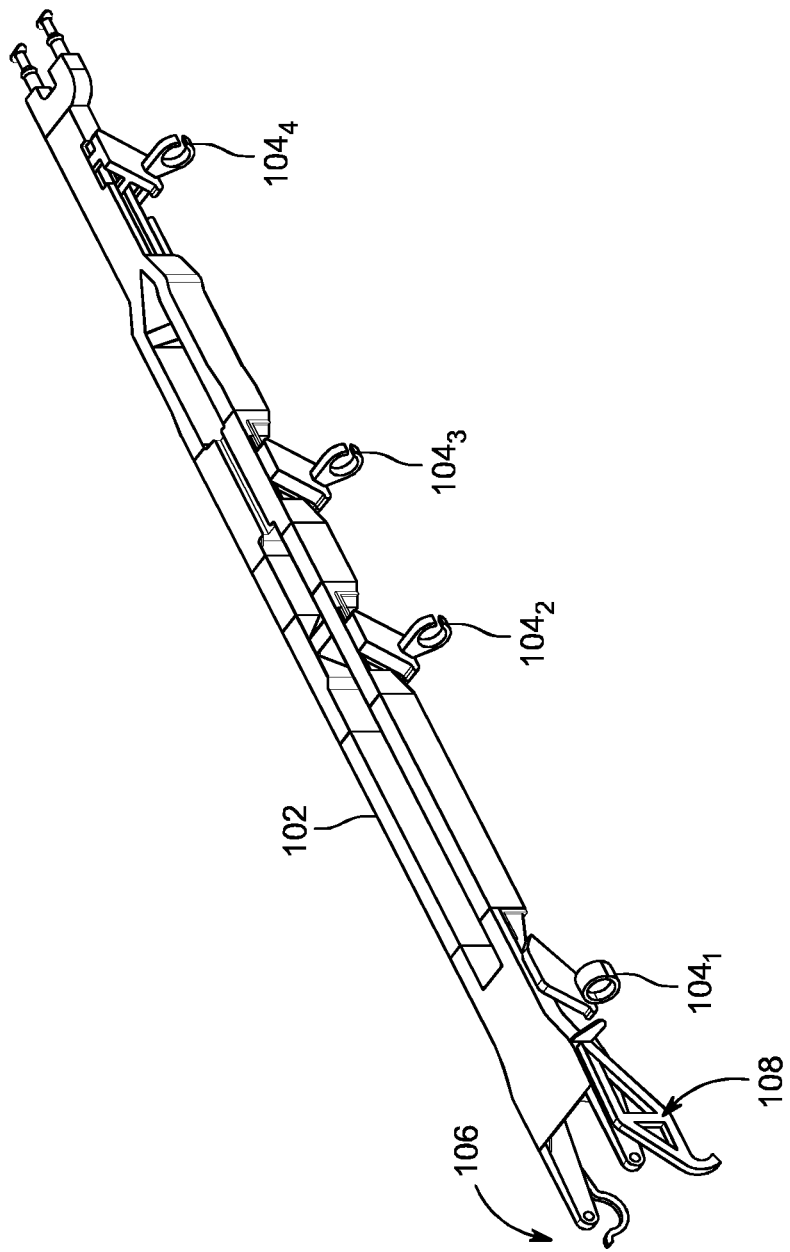
FIG. 2 illustrates a loading arm for holding and moving a pipe section.

In this embodiment the system includes a holding element, in this case a loading arm 202, for holding the pipe section (not shown) in the first position, as shown in FIG. 3a. Loading arms per se are generally known. An example is shown in FIG. 2.

The system also includes two sliding members, which in this case are a deck trolley 204 and a tower trolley 208.

The deck trolley 204 is pivotally connected to an end region of the loading arm 202, and is moveable along the surface of the deck, in this case in a linear direction via rollers 210 and a set of rails, between the position shown in FIG. 3a, and towards the base of a J-lay tower 206 (shown in the sequence of FIGS. 3b to 3d). The deck trolley has a steel body portion and rollers or wheels mounted to the body portion.

The other end region of the loading arm is pivotally connected to the tower trolley 208. The tower trolley 208 is moveable along the tower 206. In this case the tower trolley 208 is movable in a linear direction between an initial position lower down the J-lay tower 206 (as shown in FIG. 3a), and a position higher up the J-lay tower (i.e. the end furthest from the deck of the vessel, as shown in FIG. 3d). The tower trolley 208 moves up/down the tower via rollers 212 along a set of rails. The tower trolley is freely moveable according to where the loading arm/hoist takes it. The tower trolley has a steel body portion and rollers or wheels mounted to the body portion.

The system also includes a hoist system 214 operably engaged with the tower 206, and both ends of the loading arm 202, for drawing the loading arm towards the tower. In this case the hoist system 214 includes a rope 216 and various pulleys $220_{1-7}$, and is connected with a hoist winch (not shown), indicated by the arrows 218.

Of course the skilled person will be aware that any suitable winch may be used, for example a double-drum hoist winch. The winch may be mounted at any suitable position on the vessel, e.g. the winch may be deck mounted, or otherwise.

The hoist system 214 includes a first portion, which is a vertical element 222, here a multi-fall system between the pulleys $220_1$, $220_2$, $220_3$ and $220_4$ in that order. The portion 222 is arranged to exert a force in a vertical direction. The vertical element 222 extends between pulleys on a head portion 226 of the tower 206 and pulleys on the loading arm.

There is also a further portion of the hoist system, which is a horizontal element 224, arranged to exert a force in a horizontal direction. The pulley $220_4$ transitions the vertical element to the horizontal element. The portion 224 extends along the loading arm, around the deck trolley 204, and returns back along the loading arm.

Thus, overall, and as depicted in FIG. 4, the rope 216 extends from a hoist winch over an upper part of the tower 206, around a pulley $220_1$ on a head portion 226 of the tower, downwards to a pulley $220_2$ on the loading arm, upwards to another pulley $220_3$ on the head portion of the tower, downwards to another pulley $220_4$ on the loading arm (close to the pulley $220_2$), along the loading arm to a pulley 2205 near the other end, around the deck trolley 204 via a pulley $220_6$ and $220_7$ on two corner regions, and then back along the length of the loading arm.

A skilled person will realise that the end 228 of the rope 216 may be connected to a fixed structure such as the deck. Moreover, the end 228 of the rope 216 can be in a loop configuration, such that endless routing of said rope 216 is provided. However, in this embodiment, the hoist system includes two ropes that follow the above-noted route (not visible in the side view of FIG. 3a). A first rope $216_1$ is located towards a starboard side of the apparatus and a second rope 2162 is located towards a port side of the apparatus, as depicted in FIG. 5, and each follow the route around the tower and loading arm as described above. The ropes are offset by a distance x in the lateral direction (between starboard and port). The end regions of the ropes $216_{1,2}$ are joined by a balance beam 230. The balance beam is a steel rail connected to the deck, allowing the rope ends to travel typically 1.5 m. At the end of the travel the balance beam reacts the loads experienced in a single rope.

By using a balance beam 230, the loads experienced by the two ropes can be equalised, and the full capacity of both ropes is utilised. Also, if one rope were to fail, the second rope would remain for use.

FIG. 6 shows another view of the loading arm 202 of FIG. 3a, in more detail. The pipe section 232 being held by the loading arm is shown in FIG. 6. FIG. 6 also shows clamps $234_{1-4}$ for holding the pipe section in the loading arm. The clamps $234_{1-4}$ typically have a 30 to 40 tonne capacity to withhold radial and/or axial loads. Typically at least one clamp is moveable, along the length of the loading arm to allow the loading arm to clamp pipe sections having differing lengths.

FIG. 7 shows how the J-lay tower is pivotable to various positions, and can be moved to accommodate different water depths. That is, for shallower water, the tower is moved forward, away from the 90 degree position, as shown by the reference 206'. This allows the lay-line of the pipe to keep the pipe within its elastic bending limits, to avoid damage to the pipeline. FIG. 8 shows the base of the tower in more detail, and shows the pipe section 232 in position adjacent the tower 206 in the vertical position of FIG. 3a, and a pipe section 232' adjacent the tower 206' in a more forward position, as per FIG. 7.

In use, the hoist winch is wound to apply a force to the hoist rope 216 in the direction of the arrows 218. As the rope is wound around the winch the length of the remaining rope is reduced.

As the winch is wound, the multi-fall system is contracted in the vertical direction, applying a vertical force to the loading arm. At the same time, the rope length is also reduced in the horizontal direction, applying a horizontal force to the loading arm.

Because of the deck trolley and tower trolley, the loading arm can slide in both horizontal and vertical directions along the pathway defined by the trolley rails.

As the loading arm is hoisted it pivots around the pivoting attachment, at both ends, i.e. with respect to the deck trolley 204 and the tower trolley 208.

As shown in FIG. 3b, the tower end region of the loading arm 202 is hoisted towards the rotatable pulley $220_3$, with the movable tower trolley 208 traversing the J-lay tower 206 as the rotatable pulleys $220_{2,3,4}$ are drawn together. As the load at the upper end of the vertical element increases (with the weight of the loading arm), the horizontal element becomes more effective, applying a force between the end of the rope 228, the pulleys of the deck trolley $220_{6,7}$ and the pulley $220_4$ at the tower end region of the loading arm. In effect, the rope extending around the loading arm (and deck trolley) acts to pull the deck trolley, and therefore the end of the loading arm, towards the end 228.

The overall result of the winching of the rope around the pulleys is that the loading arm is pulled upwards and towards the J-lay tower, with the horizontal force helping to reduce the vertical lifting force needed. That is, the horizontal and vertical forces are used together and automatically share the load between them, in a system that is the most efficient sharing of loads possible.

In the embodiment shown, the force by which the loading arm 202 is hoisted up the tower (the hoist force) is approximately 3 times that applied by the hoist winch (because of the multi-fall system). This ratio of hoist force to applied winch force may be increased with the inclusion of more rotatable pulleys within the multi-fall pulley system.

The horizontal force applied to the deck trolley 204 is equal to that applied to the hoist rope by the hoist winch.

That is, the system may generate a 3:1 hoist force and a 1:1 horizontal force from a single rope and winch drum.

FIGS. 3b-3d illustrate the movement of the loading arm 202 as a result of the hoist winch being in operation. FIG. 3c shows the loading arm continuing to be lifted upwards at the tower end and the other end being pulled towards the tower. FIG. 3d illustrates the configuration once the loading arm has been hoisted to the vertical position (i.e. parallel with the J-lay tower 206).

Once the pipe section is situated against the tower (FIG. 3d), the loading arm clamps $234_{1-4}$ move the pipe section 232 into the main pipe delivery line (the "firing line") of the J-lay tower 206.

The pipe section is then aligned with the field joint (of the previously deployed pipe section) and lowered until the lower end of the pipe section 232 meets an upper end of the field joint. Alignment may be achieved by the clamps affecting the vertical position, fore-aft position (by bending) and/or by rotation.

The lower end of the pipe section is coupled to the field joint by welding. The previously deployed pipe section is held in position by a hang off clamp.

The pipe section is passed from the loading arm clamps $234_{1-4}$ to a series of clamps within the J-lay tower (not shown), for example 2 clamps, at least one of which is a travelling clamp able to move along the J-lay tower. The clamps on the tower cooperate to lower the pipe section into the sea following the lay-line and such that the upper end of the pipe section becomes the next field joint. Typically, the tower clamps have a capacity of 1000 to 2000 tonnes, which is sufficient to support the weight of the deployed pipe following attachment of the pipe section to the deployed pipe.

The loading arm hoist winch is able to render to allow the loading arm to return to the horizontal to repeat the above process.

Various modifications to the detailed designs as described above are possible.

For example, the system may also comprise a slave winch (hold back winch). The slave winch may be attached to the deck trolley 204, as indicated in FIG. 3a by the arrow 302. The winch may apply a force to the deck trolley in the opposite direction to that applied by the hoist system 214. By applying a relatively small force with the slave winch, the forces in the horizontal and vertical directions will be affected. The arrangement ensures that the additional tension generated in the hoist winch is only equal to the tension in the hold back winch. Also, the loading arm 202 may be disengaged from the tower and brought back to its initial horizontal position following deployment of the pipe section.

The vessel may have a ramp situated on the linear path of the deck trolley at the base of the J-lay tower 206, such that as deck trolley approaches the base of the J-lay tower, it becomes inclined from horizontal. In this manner, the ramp utilises gravity to return the loading arm 202 to its initial horizontal position, without the requirement of an additional hold back winch.

It should be noted that although the J-lay tower in FIG. 3d is vertical (i.e. at 90 degrees to the deck of the vessel), it may be situated at any angle according to the required angle of deployment of the pipe section or elongate element. The angle of the tower may also be changed during use to accommodate for the changing depth of water along the lay-line. Because the loading arm/elongate element is operably connected with the tower, hoisting of the elongate element towards the tower results in a predetermined accuracy above a set location being achieved.

In another embodiment, the position on the deck trolley 204 where the loading arm 202 is pivotally attached is movable in a height position. In this manner the vertical position of the entire loading arm relative to the vessel deck can be adapted.

Rather than a rope or ropes, the hoist system may utilize chains or cords, or the like.

In the above embodiment, the hoist system is for drawing the holding element towards the upright structure. Rather than the winch and pulley system described, the hoist system may include a pair of rack and pinion arrangements (in a similar way to the trolley moving along rails on the deck or tower). Each sliding structure, i.e. the pinions (previously trolleys) is slideable on a rack against the deck or tower. The respective horizontal and vertical forces are applied to the pinions via a hydraulic system to drive the pinions along the racks. The elongate element that has an end region connected to each pinion will be moved in the same way as described above regarding the previous embodiment. Thus, the arrangement includes a linear actuator in two directions so as to slide two ends of an elongate element in a particular direction.

It will be appreciated that although the system has been described in relation to movement of a pipe section for a J-lay operation, the system may be more widely used for positioning other elongate elements. Similarly, the elongate elements may be moved from a more vertical position to a more horizontal position by using the disclosed arrangement with features rotated through other angles (e.g. 90 degrees).

For example, there may be provided a system for moving an elongate element from a first position towards a second position adjacent an upright structure, comprising:
  a first sliding member pivotally for supporting an end region of the elongate element, and moveable along a base or ground surface;
  a further sliding member pivotally connected to a further end region of the elongate element, and moveable along the upright structure; and
  a hoist system for drawing the elongate element towards the upright structure such that the elongate element is moved towards the second position,
  wherein the hoist system comprises a first portion and a further portion, the first portion arranged to exert a force in a first direction and the further portion arranged to exert a force in a further direction.

With the above-described arrangement the loading arm and pipe section can be presented to the tower at the same position on the tower and relative to the field joint, independent of the angle the tower is sitting at the time.

Independent of the tower angle, the pipe section may be presented at the same longitudinal position on the deck. By adjusting the lower end with a linkage arrangement, and the upper end with a loading arm winch, the loading arm can be positioned on deck to pick up the pipe section at a consistent position relative to the loading arm and deck.

With the system described, a single hoist arrangement is used to bring a pipe section or other elongate element to a predetermined, more vertical position. The system is therefore a less complicated arrangement compared to some other known systems.

The system is also more accurate than some other known systems because the movement of each end of an elongate element is constrained to move along a single degree of freedom (e.g. along the rails that the deck trolley and tower trolley follow).

The system allows for a relatively constant torque-speed profile. That is, the horizontal element of the hoist system prevents the load in the vertical direction becoming exponentially higher as the loading arm is lifted. The horizontal element of the hoist system pulls an end of the elongate element to the required position, and shares the load level with the vertical pulling element. So for a particular distance of rope winched, the same distance of deck travel occurs. This gives a stable speed condition to the system.

Various specific advantages of the optional features described above will now be described. These are in addition to the various advantages already described above in relation to various parts of the system or the system as a whole. It will be appreciated that numerous advantages can be achieved with the system and method described; some of those are achieved by the overall system, some are achieved by a combination of features and some are achieved by a specific feature.

Aptly, the hoist system comprises at least one rope, chain or cord, a pulley on the further end region of the holding element; and a pulley on the first sliding member. With this arrangement, the rope chain or cord may be fed around the pulleys and together they may be used to actuate movement from both ends of the elongate element (via the pulley on one end region and the pulley on the sliding member that is connected with the other end region).

Aptly, the hoist system comprises at least two rope chains or cords or a combination thereof, and a balance beam connected therebetween. With this arrangement, the loads experienced by the two ropes/chains/cords can be equalised, and the full capacity of both ropes/chains/cords is utilised. Also, for example, if one rope were to fail, the second rope would remain available for use. This may be sufficient to continue the operation temporarily without failure of further structural parts.

Aptly, the hoist system follows a route including a multi-fall system between the upright structure and the further end region of the holding element, to the first end region of the holding element, around the first sliding member, and back towards the upright structure. With this arrangement, a single hoist system is used to bring the elongate element to its second position. This may be less complex than other known systems. The hoist system may be used to maintain control of the entire movement sequence, rather than separate equipment taking primary control at different times.

Aptly, the first portion exerts a force to lift the further end region of the holding element, and the further portion exerts a force to move the first end region of the holding element towards the upright structure. With this arrangement, the second portion of the hoist system plays a part in the overall movement of the elongate element to its required position, and shares the load of the first portion. Thereby, the lifting load required by the first portion is reduced accordingly.

Aptly, the first direction is substantially vertical and the further direction is substantially horizontal. With this arrangement, an elongate element may be lifted from a substantially horizontal position, e.g. on a deck of a vessel, and moved to a more vertical position, e.g. adjacent a J-lay tower. The horizontal and vertical loads are both used to complement each other to reduce overall loads experienced.

Aptly, the holding element is configured to be raised in a height direction with respect to the base, ground or deck surface. In this manner the vertical position of the entire loading arm or holding element relative to the deck, base or ground can be adapted to suit the requirements of the specific use.

Aptly, the system may also include a slave winch operably connected with the first sliding member and operable to provide a force in a direction away from the upright structure, the force being smaller than the force the hoist system applies in the opposite direction. With this arrangement, the winch may apply a force to the sliding member in the opposite direction to that applied by the hoist system. By applying a relatively small force with the slave winch, the forces applied by the hoist system will be affected, and can be used to help improve the overall load level in the system.

Also, the holding element may be disengaged from the upright structure and brought back to its initial position after a raising sequence has been completed.

Aptly, a vessel includes a tower as the upright structure, and the system including elements described above. Thus, a vessel can be used for lifting one or more pipe section to an appropriate position in a J-lay operation. It should be noted that a vessel comprising the tower and the system described above will avoid stability issues for the vessel when in operation.

Aptly, the method may include placing the elongate element in a holding element before the steps of sliding and drawing. In this way, movement of the elongate element is via the holding element and forces are applied to the holding element to thereby position the elongate element.

Aptly, the drawing step includes pulling the hoist system along a route including a multi-fall system between the upright structure and the further end region of the holding element, to the first end region of the holding element, around the first sliding member, and back towards the upright structure. With this arrangement, a single hoist system is used to bring the elongate element to its second position. This may be less complex than other known systems. The hoist system may be used to maintain control of the entire movement sequence, rather than separate equipment taking primary control at different times.

Aptly, the method includes pulling the holding element towards the upright structure and lifting the holding element. With this arrangement, the two movements play a part in the overall movement of the elongate element to its required position, and share the load. Thereby, the lifting load required is reduced accordingly.

Aptly the method includes moving an elongate element from a first (e.g. generally horizontal) position towards a second position (e.g. more vertical than the first position) adjacent an upright structure on the deck of a vessel. With this arrangement, an elongate element may be lifted from a substantially horizontal position, e.g. on a deck of a vessel, and moved to a more vertical position, e.g. adjacent a J-lay tower. The horizontal and vertical loads are both used to complement each other to reduce overall loads experienced.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A system for moving an elongate element from a first position towards a second position adjacent an upright structure on a vessel, comprising:
    a holding element for holding the elongate element in the first position;
    a first sliding member pivotally connected to an end region of the holding element, and moveable along a base, ground or deck surface;
    a further sliding member pivotally connected to a further end region of the holding element, and moveable along the upright structure; and
    a hoist system operably engaged with the upright structure, the end region of the holding element and the further end region of the holding element, for drawing the holding element towards the upright structure such that the elongate element is moved towards the second position,
    wherein the hoist system comprises a first portion and a further portion, the first portion arranged to exert a force in a first direction and the further portion arranged to exert a force in a further direction,
    wherein the first portion exerts a force to lift the further end region of the holding element, and the further portion exerts a force to move the first end region of the holding element towards the upright structure.

2. A system as claimed in claim 1, wherein the hoist system comprises
    at least one rope, chain or cord,
    a pulley on the further end region of the holding element; and
    a pulley on the first sliding member.

3. A system as claimed in claim 1, wherein the hoist system comprises at least two rope chains or cords or a combination thereof, and a balance beam connected therebetween.

4. A system as claimed in claim 1, wherein the hoist system follows a route including a multi-fall system between the upright structure and the further end region of the holding element, to the first end region of the holding element, around the first sliding member, and back towards the upright structure.

5. A system as claimed in claim 1 wherein the first direction is substantially vertical and the further direction is substantially horizontal.

6. A system as claimed in claim 1 wherein the holding element is configured to be raised in a height direction with respect to the base, ground or deck surface.

7. A system as claimed in claim 1 further comprising a slave winch operably connected with the first sliding member and operable to provide a force in a direction away from the upright structure, the force being smaller than the force the hoist system applies in the opposite direction.

8. A vessel comprising a tower as the upright structure, and the system of claim 1.

9. A method of moving an elongate element with the system of claim 1 from a first position towards a second position adjacent an upright structure on a vessel, the method comprising:
    placing the elongate element in the holding element and holding the elongate element in a first position;
    sliding an end region of the elongate element along a base, ground or deck surface;
    sliding a further end region of the elongate element along the upright structure; and
    pulling the holding element towards the upright structure and lifting the holding element to draw the elongate element towards the upright structure such that the elongate element is moved towards the second position, using the hoist system.

10. A method as claimed in claim 9 wherein the drawing step comprises pulling the hoist system along a route including a multi-fall system between the upright structure and the further end region of the holding element, to the first end region of the holding element, around the first sliding member, and back towards the upright structure.

11. A method as claimed in claim 9 comprising moving an elongate element from a first position towards a second position adjacent an upright structure on the deck of a vessel.

* * * * *